(12) United States Patent
Su et al.

(10) Patent No.: US 10,312,725 B2
(45) Date of Patent: Jun. 4, 2019

(54) POWER SUPPLY SYSTEM WITH IDENTIFICATION CODE UPDATING CAPABILITY AND METHOD FOR CHARGING AN ELECTRONIC DEVICE

(71) Applicant: Chicony Power Technology Co., Ltd., New Taipei (TW)

(72) Inventors: Yi-Ching Su, New Taipei (TW); Yang Wang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 231 days.

(21) Appl. No.: 15/014,287

(22) Filed: Feb. 3, 2016

(65) Prior Publication Data

US 2017/0117719 A1    Apr. 27, 2017

(30) Foreign Application Priority Data

Oct. 23, 2015    (TW) .............................. 104134868 A

(51) Int. Cl.
| | |
|---|---|
| *H02J 7/00* | (2006.01) |
| *H02J 7/14* | (2006.01) |
| *H02J 7/04* | (2006.01) |
| *G06F 1/26* | (2006.01) |
| *H04M 1/725* | (2006.01) |

(52) U.S. Cl.
CPC ................ *H02J 7/041* (2013.01); *G06F 1/26* (2013.01); *H02J 2007/0001* (2013.01); *H02J 2007/0096* (2013.01); *H04M 1/72527* (2013.01)

(58) Field of Classification Search
USPC ........ 320/106, 107, 110, 112, 113, 134, 132, 320/136, 137
See application file for complete search history.

(56) References Cited

U.S. PATENT DOCUMENTS

| | | | | |
|---|---|---|---|---|
| 5,606,242 A * | 2/1997 | Hull | ...................... | H02J 7/0004 320/106 |
| 5,633,573 A * | 5/1997 | van Phuoc | ......... | G01R 31/3655 320/128 |
| 5,680,027 A * | 10/1997 | Hiratsuka | .......... | G01R 31/3624 307/150 |
| 5,818,197 A * | 10/1998 | Miller | ................... | H02J 7/0003 320/107 |
| 6,555,991 B1 * | 4/2003 | Zettel | .................... | H02J 7/0016 320/137 |

(Continued)

*Primary Examiner* — Alexis B Pacheco
(74) *Attorney, Agent, or Firm* — Muncy, Geissler, Olds & Lowe, P.C.

(57) ABSTRACT

A power supply system with identification code updating capability is used for providing an electric power to an electronic device having a first identification (ID) code. The power supply system includes a power supply device and an ID code updating module. The power supply device is configured to provide the electric power to the electronic device and includes a memory unit. The memory unit is configured to store a look-up table including at least one second ID code. The ID code updating module is electrically connected to the power supply device. When the second ID code listed in the look-up table does not match with the first ID code of the electronic device, the ID code updating module updates a second ID code matching with the first ID code in the look-up table. A charging method is further disclosed.

10 Claims, 5 Drawing Sheets

(56) References Cited

U.S. PATENT DOCUMENTS

| | | | | |
|---|---|---|---|---|
| 8,487,480 | B1* | 7/2013 | Kesler | B60L 11/007 307/104 |
| 9,774,210 | B1* | 9/2017 | Wright | H02J 7/025 |
| 2006/0028178 | A1* | 2/2006 | Hobbs | B60L 3/0046 320/128 |
| 2007/0046261 | A1* | 3/2007 | Porebski | G01R 31/3641 320/132 |
| 2009/0096413 | A1* | 4/2009 | Partovi | H01F 5/003 320/108 |
| 2009/0295230 | A1* | 12/2009 | Rousu | H02J 7/0068 307/80 |
| 2011/0264899 | A1* | 10/2011 | Evans | G01R 31/3682 713/1 |
| 2012/0032632 | A1* | 2/2012 | Soar | H01F 38/14 320/108 |
| 2012/0169271 | A1* | 7/2012 | Dvorkin | G01K 13/00 320/106 |
| 2012/0200266 | A1* | 8/2012 | Berkowitz | B60L 11/1861 320/139 |
| 2012/0235636 | A1* | 9/2012 | Partovi | H02J 7/025 320/108 |
| 2013/0084800 | A1* | 4/2013 | Troberg | H04B 5/0037 455/41.1 |
| 2013/0278221 | A1* | 10/2013 | Maeda | B60L 3/0046 320/134 |
| 2015/0048684 | A1* | 2/2015 | Rooyakkers | H04L 9/3263 307/65 |
| 2016/0006264 | A1* | 1/2016 | Alperin | H02J 5/005 307/104 |
| 2016/0028130 | A1* | 1/2016 | Dvorkin | H01M 10/441 429/90 |

* cited by examiner

POWER SUPPLY SYSTEM WITH IDENTIFICATION CODE UPDATING CAPABILITY AND METHOD FOR CHARGING AN ELECTRONIC DEVICE

BACKGROUND OF THE INVENTION

Field of the Invention

The present disclosure relates to a power supply system. More particularly, the present disclosure relates to a power supply system with identification (ID) code updating capability.

Description of Related Art

Universal serial bus (USB) transmission interface has merits in hot plug, plug and play, high portability, high transmission speed, and so forth. Therefore, it has become a basic interface for various peripheral electronic devices, such as keyboards, mice, printers, scanners, and external storage devices. The USB transmission interface serves to not merely transport data between computer and the peripheral electronic devices, but draw power from the computer to the peripheral electronic device. Therefore, a connector with the USB transmission interface has replaced wall warts and is widely used for the portable electronic devices, such as digital cameras and cellular phones, and the USB power delivery (PD) specification is then developed.

The USB Implementers Forum (USB-IF), an industry trade association incorporating companies from the computer and electronics devices, standardizes the USB PD specification, which defines five fixed power profiles for power. The USB type-C interface is the new USB-IF standard, which provides the charging compatibility between one power supply and electronic devices. The charging compatibility means that a power supply produced by a particular vendor can provide power to electronic devices even if the electronic device is not produced by the particular vendor.

The USB PD specification defines additional extensions to the vendor defined message (VDM) allowing vendors to exchange information, such as a vendor ID (VID), of the electronic devices they made. VID will be checked and verified when the electronic device is connected to the power supply fitted with USB PD specification. The normal charging procedure cannot be performed when the electronic devices having wrong VID or without VID. More particular, the normal charging procedure may be performed when the VID of the electronic device matches with the VID of the power supply fitted with USB PD specification, and the power supply provides the largest rated charging power to the electronic device. However, when the VID of the electronic device is not match with the VID if the power supply or the electronic device does not have the VID, the power supply provides the power lower than the rated charging power to the electronic device, thus the charging procedure may or may not be performed, and even if the charging procedure is performed, the charging time is extended since the power provided by the power supply is lower than the rated charging power.

SUMMARY OF THE INVENTION

According to one aspect of the present disclosure is to provide a power supply system with identification code (ID) updating capability.

According to one aspect of the present disclosure, a power supply system with identification code updating capability is used for providing an electric power to an electronic device having a first identification (ID) code. The power supply system includes a power supply device and an ID code updating module. The power supply is configured to provide the electric power to the electronic device and includes a memory unit. The memory unit is configured to store a look-up table including at least one second ID code. The ID code updating module is electrically connected to the power supply device. When the second ID listed in the look-up table does not match with the first ID code of the electronic device, the ID code updating module updates a second ID code matching with the first ID code in the look-up table.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
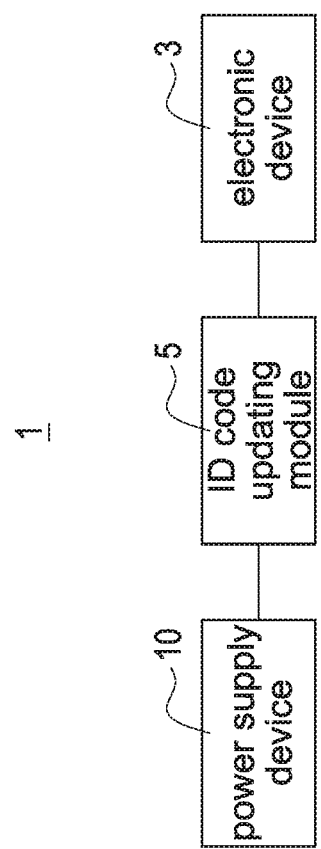
FIG. 1 is a circuit block diagram of a power supply system with identification code updating capability according to a first embodiment of the present invention.

Reference is made to FIG. 1, which is a circuit block diagram of a power supply system with identification code updating capability according to a first embodiment of the present invention. In FIG. 1, the power supply system with identification code updating capability (hereafter "the power supply device") includes a power supply device 10, an electronic device 3, and an identification (ID) code updating module 5.

In FIG. 1, the power supply device 10 is electrically connected to a power source Vin, and is configured to provide powers to meet the requirements of the electronic device 3 during a normal operation and a charging operation. More particularly, the rated power demanded for the electronic device 3 during the charging operation is higher than that of during the normal operation since the electronic device 3 needs not only the power for driving the components thereof but also the power for charging battery thereof during the charging operation. The electronic device 3 has a first ID code, which is a vendor identification (VID) code. A look-up table including at least one second ID code is stored in the power supply device 10, and the second ID code is a VID code.

When the electronic device 3 is connected to the power supply device 10, the electronic device 3 determines that the second ID code listed in the look-up table is matching with the first ID code or not, and sends a determined result to the power supply device 10. Thereafter, the power supply device 10 provides the power to meet the requirements of the electronic device 3 according to the determined result. More particularly, when one of the second ID codes listed in the look-up table is matching with the first ID code, the electronic device 3 makes the power supply device 10 provide a first power to meet the requirement of the electronic device 3 in the charging operation. The first power generated by the power supply device 10 is equal to the largest required-charging power of the electronic device 3, and the electronic device 3 receives the first power and then performs a charging procedure. On the contrary, when all of the second ID codes listed in the look-up table do not match with the first ID code, the electronic device 3 makes the power supply device 10 provide a second power smaller than the first power or a third power smaller than the second power. The electronic device 3 receives the third power met the requirement of the normal operation, and does not perform the charging procedure. The electronic device 3 receives the second power and performs the charging procedure. It should be noted that the charging time when the electronic device 3 receives the second power is longer than that when the electronic device 3 receives the first power since the second power is smaller than the first power.

Figure 2:
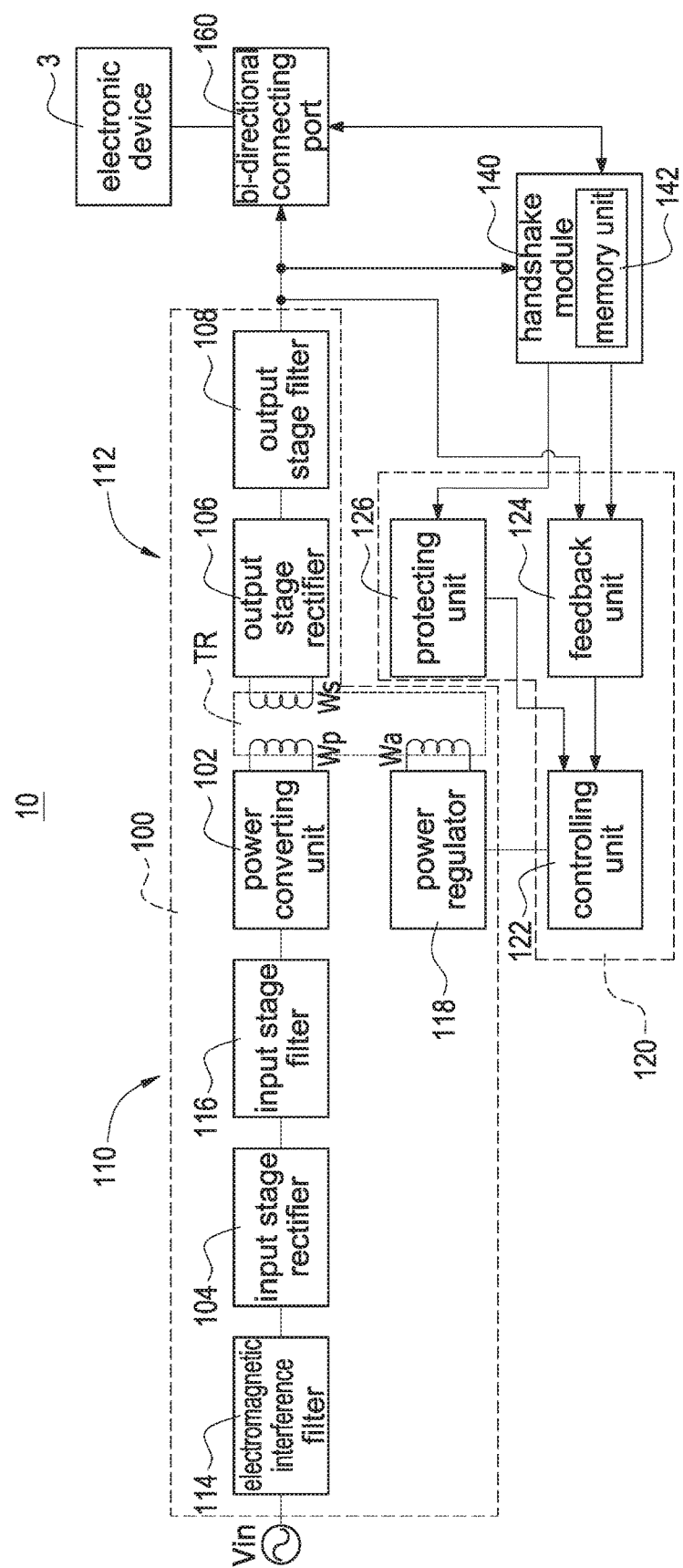
FIG. 2 is a circuit block diagram of a power supply device according to the first embodiment of the present invention.

Reference is made to FIG. 2, which is a circuit block diagram of a power supply device according to the first embodiment of the present invention. The power supply device 10 includes a power converting module 100, a controlling module 120, and a handshake module 140. The power converting module 100 is electrically connected to the power source Vin, and is configured to convert the power provided by the power source Vin into the first power, the second power, or the third power required by the electronic device 3.

The controlling module 120 is electrically connected to the power converting module 100 and configured to control the operation of the power converting module 100, thus the first power, the second power, and the third power can be provided. The handshake module 140 is electrically connected to the controlling module 120 and includes a memory unit 142 configured to store the look-up table.

In FIG. 2, the power converting module 100 includes a power converting unit 102, an input stage rectifier 104, an output stage rectifier 106, and an output stage filter 108. The power converting unit 102 is, for example, a flyback converter. The power converting unit 102 receives the alternative current (AC) power provided by the power source Vin and controlling signals sent by the controlling module 120, and converts the AC power to the first power, the second power, or the third power required by the electronic device 3, where the first power, the second power, and the third power may be direct current (DC) powers.

The power converting unit 100 includes a transformer TR having a primary winding Wp and a secondary winding Ws coupled with each other. Specifically, the primary winding Wp and the secondary winding Ws of the transformer TR separates the power converting module 100 into an input stage 110 and an output stage 112 isolating from each other, the input stage 110 is connected to the power source Vin, and the output stage is connected to the electronic device 112. The input stage rectifier 104 and the power converting unit 102 are arranged at the input stage 110, and the output rectifier 106 and the output rectifier 108 are arranged at the output stage 112.

The input rectifier 104 is electrically connected to the power source Vin and the power converting unit 102, and is configured to rectify the AC power into an input stage pulsating DC power. The input rectifier 104 is, for example, a bridge rectifier. The power converting unit 102 receives the input stage pulsating DC power and is configured to conduct the input stage pulsating DC power to the primary winding Wp of the transformer TR.

The output stage rectifier 106 is electrically connected to the secondary winding Ws and is configured to rectify the power outputted from secondary winding Ws into an output stage pulsating DC power. The output stage rectifier 106 is, for example, a bridge rectifier. The output stage filter 108 is electrically connected to the output stage rectifier 106 and is configured to filtering the ripple of the output stage pulsating DC power and then sent a stable DC power to the electronic device 3 to meet the requirements of the electronic device 3 during the normal operation and the charging operation.

The power converting module 100 may further include an electromagnetic interference filter 114 and an input stage filter 116. The electromagnetic interference filter 114 and the input stage filter 116 are arranged at the input stage 110. The electromagnetic interference filter 114 is arranged between the power source Vin and the input rectifier 104 and electrically connected thereto. The electromagnetic interference filter is configured to filter the electromagnetic noise within the AC power provided by the power source Vin. The input stage rectifier 104 is configured to rectify the AC power which the electromagnetic noise is filtered to the input stage pulsating DC power. The input stage filter 104 is arranged between the input stage rectifier 104 and the power converting unit 102 and electrically connected thereto. The input stage filter 104 is configured to filter the noise within the input stage pulsating DC power.

The transformer TR further includes an auxiliary winding Wa isolating from the primary winding Wp and the secondary winding Ws, and coupled with the primary winding Wp. The auxiliary winding Wa is electrically connected to the controlling module 120 and provides a power to meet the requirement of the controlling module 120. It should be noted that the auxiliary winding Wa may be directly connected to the controlling module 120, and provides the power to meet the requirement of the controlling module 120 by converting the power coupled from the primary winding Wp to the auxiliary winding Wa according winding turn ratio there between. However, the power converting module 100 may further includes a power regulator 118 arranged between the auxiliary winding Wa and the controlling unit 122, the power regulator 118 receives the power conducted through the auxiliary winding Wa and outputs a regulated power to meet the requirement of the controlling module 120.

The controlling module 120 includes a controlling unit 122, a feedback unit 124, and a protecting unit 126. The controlling unit 122 is, for example, a pulse-width-modulator and electrically connected to the power converting unit 102. The controlling unit 122 sends the controlling signals to regulate the power outputted from the power converting module 100. For instance, the controlling unit 122 may narrow the duty cycle of the controlling signal to lower the power outputted from the power converting module 100 while the power is higher than a preset power (such as first power, the second power, or the third power required by the electronic device 3). On the contrary, the controlling unit 122 may broad the duty cycle of the controlling signal to heighten the power outputted from the power converting module 100 while the power is higher than the preset power.

The feedback unit 124 is electrically connected to the output stage filter 108, the handshake module 140, and the controlling unit 122, and is configured to generate a feedback signal and sent the feedback signal to the controlling unit 122. The controlling unit 122 generates the controlling signals with particular duty cycle according to the information involved in the feedback signal. More particularly, the feedback unit 124 is further configured to detects the power outputted from the output stage filter 108 and receive identifying signals generated by the handshake module 140, thus the feedback signal includes not only the information reflecting the power outputted from the output stage filter 108 but also the information involved in the identifying signal generated by the handshake module 140.

The protecting unit 126 is electrically connected to the handshake module 140 and the controlling unit 122 and includes an over-voltage protecting circuit and an over-current protecting circuit for providing functions of over-voltage protection and over-current protection.

The electronic device 3 determines whether one of the second ID codes listed in the look-up table is matching with the first ID code or not when the electronic device 3 is connected to the power supply device 10. A first identifying signal is generated by the electronic device 3 and transmitted to the handshake module 140 to inform the power supply device 10 about the second ID code matching with the first ID code is listed in the look-up table. The first identifying signal is then transmitted to the feedback unit 124, and the feedback unit 124 sends the feedback signal including the information that the second ID code matching with the first ID code is listed in the look-up table to the controlling unit 122. Thereafter, the controlling unit 122 drives the power converting module 100 to output the first power to the electronic device 3 to meet the requirement of the charging operation.

On the contrary, a second identifying signal is generated by the electronic device 3 and transmitted to the handshake module 140 to inform the power supply device 10 about all of the second ID codes listed in the look-up table do not match with the first ID code. The second identifying signal is then transmitted to the feedback unit 124, and the feedback unit 124 sends the feedback signal including the information that all of the second ID codes listed in the look-up table do not match with the first ID code to the controlling unit 122. Thereafter, the controlling unit 122 drives the power converting module 100 to output the second power to the electronic device 3 to meet the requirement of the charging operation or output the third power to the electronic device 3 to meet the requirement of the normal operation.

Specifically, when one of the second ID code listed in the look-up table is matching with the first ID code, the first power outputted from the power supply device 10 must include the rated voltage and/or the rated current of the electronic device 3 during charging operation.

The power supply device further includes a bi-directional connecting port 160 electrically connected to the output stage filter 108 and the handshake module 140 for transmitting data between the power supply device 10 and the electronic device 3 and conducting power from the power supply device 10 to the electronic device 3. The bi-directional connecting port 160 is, for example, an USB. More particularly, when the electronic device 3 is connected to the power supply device 10, the electronic device 3 reads the look-up table stored in the memory unit 142 via the bi-directional connecting port 160, and the first power, the second power, or the third power generated by the power supply device 10 is conducted to the electronic device 3 by the bi-directional connecting port 160.

Figure 3:
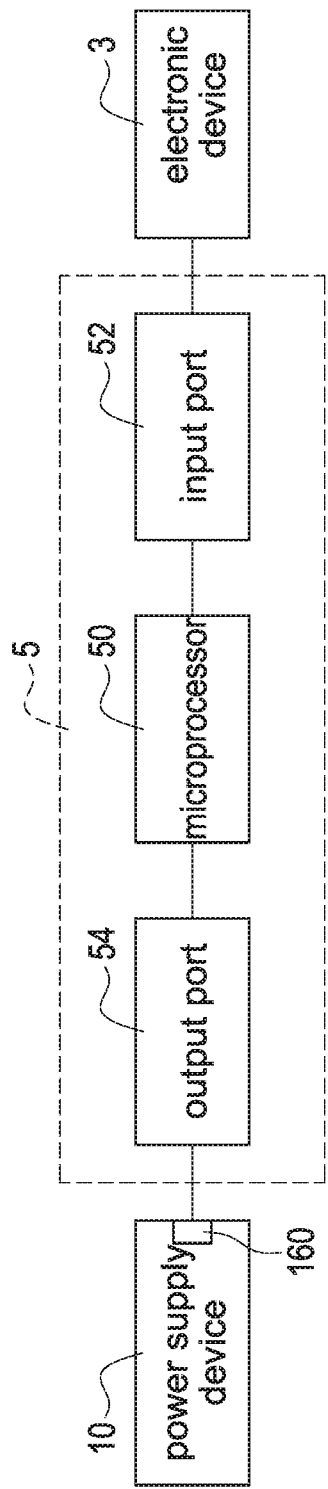
FIG. 3 is a circuit block diagram of an identification code updating module according to the first embodiment of the present invention.

Reference is made to FIG. 3, which is a circuit block diagram of an identification code updating module according to the first embodiment of the present invention. For sake of convenient explanation, FIG. 3 also illustrates the power supply device 10 and the electronic device 3. The identification code updating module 5 includes a microprocessor 50, an input port 52, and an output port 54, the microprocessor 50 is connected between the input port 52 and the output port 54, the input port 52 is configured to make a connection between the microprocessor 50 and the electronic device 3, and the output port 54 is connected to the bi-directional connecting port 160 of the power supply device 10.

The identification code updating module 5 obtains the first ID code of the electronic device 3 and updates a second ID code (thereafter "the new second ID code") matching with the first ID code to the look-up table when the second ID codes listed in the look-up table do not matching the first ID code.

Specifically, when performing an ID code updating procedure, the electronic device 3 generates information corresponding to the first ID code to the microprocessor 50 via the input port 52. The information corresponding to the first ID code is encoded by the microprocessor 50 to generates the new second ID code, and the new second ID code is then transmitted to the memory unit 142 shown in the FIG. 2 and listed in the look-up table via the bi-directional connecting port 160. Thereby the look-up list includes the new second ID code matching with the first ID code, and when the electronic device 3 having the first ID code is connected to the power supply device 10, the first power meet the charging operation of the electronic device 3 can be conducted to the electronic device 3.

It should be noted that the identification code updating module 5 is not limited to be the hardware structure shown in the FIG. 3. Selectively, the identification code updating module 5 may be software build-in the electronic device 3 or the power supply device 10.

Besides, the identification code updating module 5 is not limit to obtain the information corresponding to the first ID code from the electronic device 3. Selectively, the information corresponding to the first ID code may be obtained from cloud database. More particularly, the information corresponding to the first ID code is downloaded and transmitted to the microprocessor 50 by an electronic appliance (such as a personal computer) does not have the first ID code, and the information corresponding to the first ID code is encoded by the microprocessor 50 to generates the new second ID code, and the new second ID code is then transmitted to the memory unit 142 and listed in the look-up table via the bi-directional connecting port 160. Therefore, the power supply device 1 can be compatible with multiple electronic devices 3.

Figure 4:
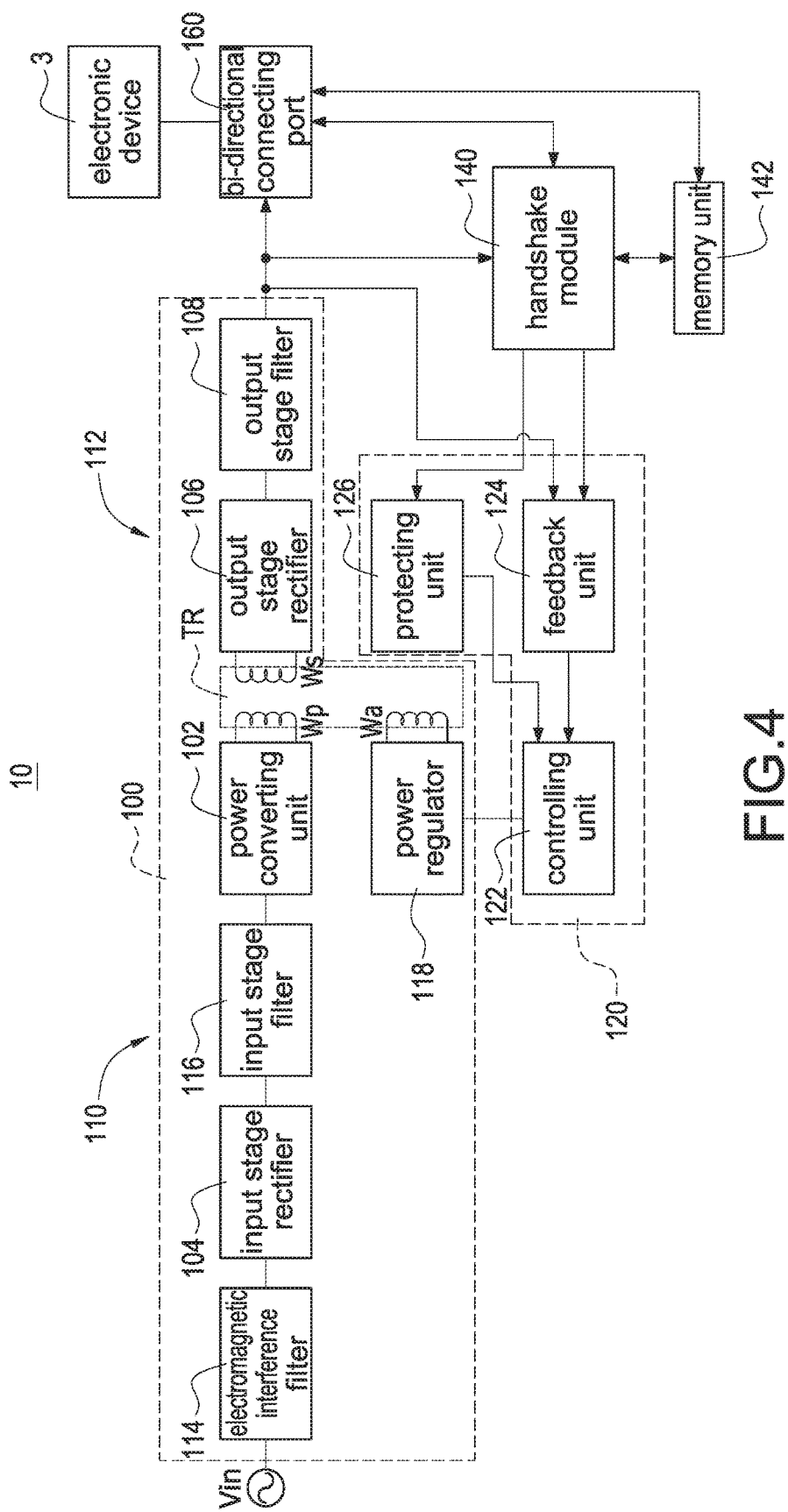
FIG. 4 is a circuit block diagram of a power supply system with identification code updating capability according to a second embodiment of the present invention.

Reference is made to FIG. 4 which is a circuit block diagram of a power supply system with identification code updating capability according to a second embodiment of the present invention. In FIG. 4, power supply system with identification code updating capability 10 (hereafter "the power supply device") includes a power supply device 100, a controlling module 120, and a handshake module 140, a memory unit 142, and a bi-directional connecting port 160.

The power converting module 100 is electrically connected to the power source Vin and is configured to converting the power source to the power met the requirement of the electronic device 3. The controlling module 120 is electrically connected to the power converting module 100 and is configured to control the power outputted from the power converting module 100. The function and relative description of the power converting module 100 and the controlling module 120 of this embodiment are the same as that of first embodiment mentioned above and are not repeated here for brevity, and the power converting module 100 and the controlling module 120 of this embodiment can achieve the functions as the power converting module 100 and the controlling module 120 of the first embodiment do.

The handshake module 140 is electrically connected to the power converting module 100 and the controlling module 120. The memory unit 142 is electrically connected to the handshake module 140 and includes a look-up table, and at least one second ID code is listed in the look-up table. The bi-directional connecting port 160 is electrically connected to the power converting module 100, the handshake module 140, and the memory unit 142 for transmitting data between the power supply device 10 and the electronic device 3 and conducting power from the power supply device 10 to the electronic device 3.

When the electronic device 3 is connected to the power supply device 10, the electronic device 3 reads the look-up table stored in the memory unit 142 solely via the bi-directional connecting port 160 to make sure that the second ID code matching with the first ID code is stored within the memory unit 142 or not. However, when the electronic device 3 is connected to the power supply device 10, the electronic device 3 may read the look-up table stored in the memory unit 142 via the bi-directional connecting port 160 and the handshake module 142 to make sure that the second ID code matching with the first ID code is stored within the memory unit 142 or not.

When performing an ID code updating procedure, the power supply device 10 is connected to the identification code updating module 5 shown in FIG. 3, the electronic device 3 may transmit the information corresponding to the first ID code to the identification code updating module 5, and the microprocessor 50 of the identification code updating module 5 encodes the information corresponding to the first ID code and generates the new second ID code matching with the first ID code, the new second ID code is transmitted to the handshake module 140 via the bi-directional connecting port 160. Hereafter, the handshake module 140 updates the new second ID code in the memory unit 142, and the new second ID code is then listed in the look-up table.

Figure 5:
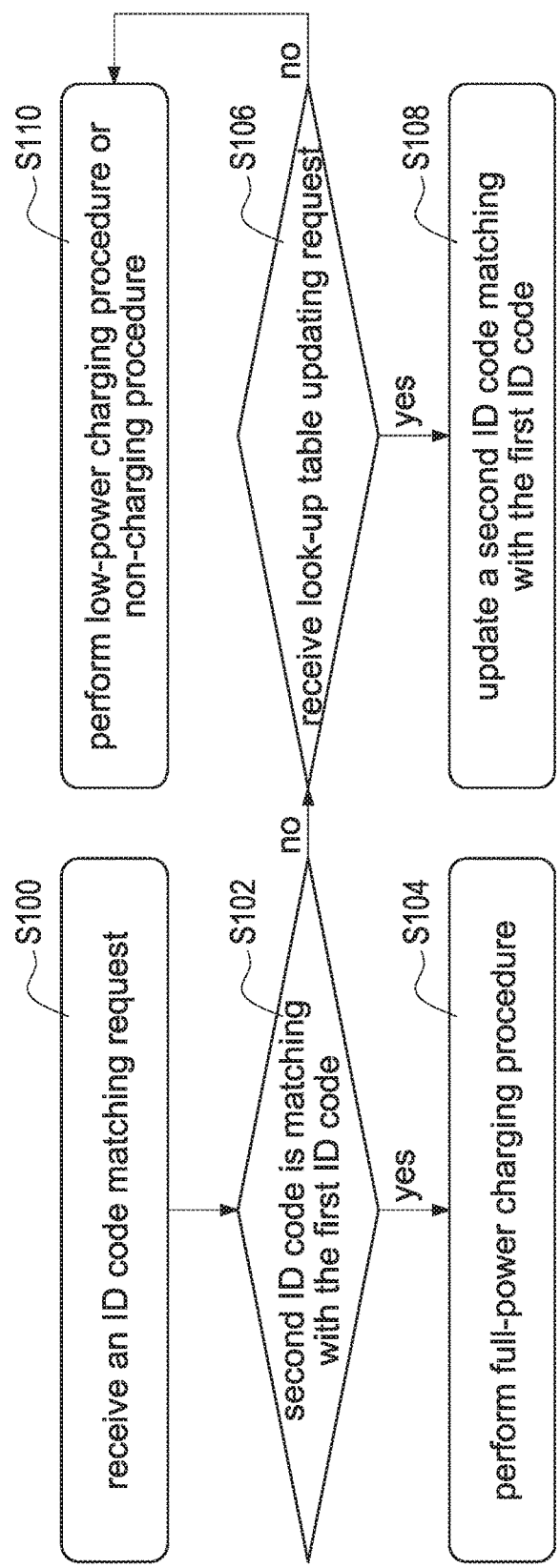
FIG. 5 is a flow diagram of a method for charging an electronic device according to the present invention.

Reference is made to FIG. 5, which is a flow diagram of a method for charging an electronic device according to the present invention. The power supply device 10 as shown in FIG. 1 is configured to provide power to meet the requirements of the electronic device 3 having a first ID code. The power supply device 10 includes a look-up table listing with at least one second ID code. When the electronic device 3 is connected to the power supply device 10, an identification (ID) code matching request may be sent by the electronic device 3. The power supply device 10 receives the ID code matching request (step 100) and allows the electronic device reading the look-up table. The electronic device 3 determines whether the second ID code listed on the look-up table is matching with the first ID code or not, and sent a determined result to the power supply device 10 (step S102). If the second ID code matches with the first ID code, a full-power-charging procedure is performed (step S104), and the power supply device 10 provides a first power to the electronic device 3, wherein the first power is the power met to the largest rated charged power required by the electronic device 3.

On the contrary, if the second ID code does not match with the first ID code, the power supply device 10 determines whether a look-up table updating request is received or not (step S106). The power supply device 10 receives information of the first ID code and updating a new second ID matching with the first ID code in the look-up table when the look-up table updating request is received by the power supply device (step S108). It should be noted that the second ID code which listed in the look-up table before the step 100 mentioned above and the new second ID code are listed in the look-up table. If the second ID code does not match with the first ID code and the power supply device 10 cannot receive the look-up table updating request, the power supply device may provide a second power which is lower than first power to the electronic device 3 to perform a low-power-charging procedure or provides a third power lower than the second power to the electronic device 3 to perform non-charging procedure (step S110). Specifically, the charging time of the electronic device 3 in the low-power-charging procedure is longer than that of in the full-power charging procedure, and in the non-charging procedure, the third power can maintain all of the operation of the electronic device 3 but charge.

It should be noted that the ID code matching request may be sent by the power supply device, and the second ID code is matching with the first ID code may be determined by the power supply device, too. Thereafter, the updating request may be sent by an external module, such as the ID code updating module shown in the FIG. 1, electrically connected to the power supply device 10, and by the external module further lists the new second ID code in the look-up table.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power supply system with identification code updating capability used for providing a first power, a second power, or a third power to an electronic device having a first identification (ID) code, the power supply system with identification code updating capability comprising:
   a power supply device configured to provide the first power, the second power, or the third power to the electronic device and comprising a memory unit for storing a look-up table, wherein the look-up table comprising at least one second ID code, wherein when the second ID code listed in the look-up table matches with the first ID code, the power supply device performs a full-charging procedure for providing the first power met to a largest rated charged power required by the electronic device to the electronic device, when the second ID code does not match with the first ID code, the power supply device performs a low-power-charging procedure for providing the second power smaller than the first power or a non-charging procedure for providing the third power smaller than the second power to the electronic device, a charging time of the electronic device in the lower-power charging procedure is longer than that of in the full-power-charging procedure, and the third power is used for maintain all of operations of the electronic device but charge; and
   an ID code updating module electrically connected to the power supply device;

wherein when the second ID code listed in the look-up table does not match with the first ID code, the ID code updating module updates the look-up table by adding the first ID code as a new second ID code in the look-up table so that the new second ID code matching with the first ID code, such that the electronic device is charged with the first power;

wherein the first ID code, the second ID code and the new second ID are vender ID codes.

2. The power supply system with identification code updating capability in claim 1, wherein the power supply device comprises:

a power converting module electrically connected to a power source;

a controlling module electrically connected to the power converting module; and a handshake module electrically connected to the power converting module and the controlling module, and comprising the memory unit, the look-up table is stored within the memory unit.

3. The power supply system with identification code updating capability in claim 2, wherein the power converting module comprises:

a transformer comprising a primary winding and a secondary winding coupled with each other;

a power converting unit electrically connected to the primary winding;

an input stage rectifier electrically connected to the power source and the power converting unit;

an output stage rectifier electrically connected to the secondary winding; and an output stage filter electrically connected to the output rectifier and the electronic device.

4. The power supply system with identification code updating capability in claim 1, wherein power converting module further comprises:

an auxiliary winding coupled with the primary winding; and a power regulator electrically connected to the auxiliary and the controlling module, wherein the power regulator is configured to provide a power to meet the requirement of the controlling module.

5. The power supply system with identification code updating capability in claim 2, wherein the controlling module comprises:

a controlling unit electrically connected to the power regulator; and a feedback unit electrically connected to the output stage filter, the handshake module, and the controlling unit.

6. The power supply system with identification code updating capability in claim 2, wherein the power supply device further comprises a bi-directional connecting port electrically connected to the power converting module and the handshake module.

7. The power supply system with identification code updating capability in claim 6, wherein the bi-directional connecting port is an universal serial bus.

8. The power supply system with identification code updating capability in claim 1, wherein the ID code updating module comprises:

a microprocessor;

an input port configured to make a connection between the microprocessor and the electronic device; and an output port configured to make a connection between the microprocessor and the power supply device, wherein information of the first ID code is transmitted to the microprocessor via the input port, the microprocessor is configured to encode the information of the first ID code and generate the second ID code matching with the first ID code, the second ID code is then stored within the memory unit via the output port.

9. A method for charging an electronic device, the method comprising:

receiving an ID code matching request;

determining whether at least one second ID code listed in a look-up table is matching with a first ID code of the electronic device, wherein when the second ID code matches with the first ID code, a full-power charging procedure is performed and the electronic device is charged with a first power met to a largest rated charged power required by the electronic device to the electronic device, when the second ID code does not match with the first ID code, a low-power-charging procedure for charging the electronic device with a second power lower than the first power or a non-charging procedure for charging the electronic device with a third power lower than the second power is performed, a charging time of the electronic device in the lower-power charging procedure is longer than that of in the full-power-charging procedure, and the third power is used for maintain all of operations of the electronic device but charge;

receiving a look-up table updating request if the second ID code listed in the look-up table does not match with the first ID code; and updating the look-up table by adding the first ID code as a new second II) code in the look-up table so that the new-a second ID code matching with the first ID code, such that the electronic device is charged with the first power;

wherein the first ID code, the second ID code and the new second ID are vender ID codes.

10. The method for charging an electronic device in claim 9, wherein when the second ID code does not match with the first ID code and the look-up table updating procedure is not received, a low-power charging procedure or a non-power charging is performed.

* * * * *